US008686577B2

(12) United States Patent
Watanabe et al.

(10) Patent No.: US 8,686,577 B2
(45) Date of Patent: Apr. 1, 2014

(54) ENGINE GENERATOR

(75) Inventors: Takatoshi Watanabe, Himeji (JP); Katsunori Tanaka, Kobe (JP); Hirotake Kobayashi, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/634,802

(22) PCT Filed: Mar. 16, 2011

(86) PCT No.: PCT/JP2011/056154
§ 371 (c)(1),
(2), (4) Date: Oct. 18, 2012

(87) PCT Pub. No.: WO2011/115149
PCT Pub. Date: Sep. 22, 2011

(65) Prior Publication Data
US 2013/0134719 A1    May 30, 2013

(30) Foreign Application Priority Data

Mar. 17, 2010  (JP) ................ 2010-061217
Dec. 29, 2010  (JP) ................ 2010-294509

(51) Int. Cl.
*F02N 7/08* (2006.01)
(52) U.S. Cl.
USPC ...................... 290/1 A; 290/40 C
(58) Field of Classification Search
USPC ........................................... 290/1 A
See application file for complete search history.

(56) References Cited

U.S. PATENT DOCUMENTS

| 4,429,676 | A  | * | 2/1984  | Gotoh et al. ............ 123/437 |
| 4,864,151 | A  | * | 9/1989  | Wyczalek et al. ........ 290/52 |
| 5,203,170 | A  | * | 4/1993  | Naito ..................... 60/524 |
| 5,703,410 | A  | * | 12/1997 | Maekawa .............. 290/40 C |
| 6,418,900 | B2 | * | 7/2002  | Itou ................... 123/184.59 |
| 6,707,169 | B2 | * | 3/2004  | Shimizu et al. ........ 290/40 C |
| 7,170,191 | B2 | * | 1/2007  | Kang et al. ............... 290/2 |
| 8,336,510 | B2 | * | 12/2012 | Asahi et al. .......... 123/90.15 |
| 2007/0017491 | A1 | * | 1/2007 | Maeda ............... 123/568.18 |
| 2010/0126170 | A1 | * | 5/2010 | Nishio et al. ............ 60/611 |
| 2013/0220278 | A1 | * | 8/2013 | Nishio et al. .......... 123/478 |

FOREIGN PATENT DOCUMENTS

| JP | 06-173715 A    | 6/1994 |
| JP | 07-039603 A    | 2/1995 |
| JP | 09-096226 A    | 4/1997 |
| JP | 11-197265 A    | 6/1999 |
| JP | 2003-079759 A  | 3/2003 |
| JP | 2007-020751 A  | 2/2007 |
| TW |    368424      | 9/1999 |
| TW | 200819613 A    | 5/2008 |
| TW | M372393 U      | 1/2010 |

OTHER PUBLICATIONS

International Search Report; PCT/JP2011/056154; May 31, 2011.
The Office Action issued on Jan. 30, 2013, in the corresponding Taiwan Patent Application No. TW100109197, which is related to U.S. Appl. No. 13/634,802.

* cited by examiner

*Primary Examiner* — Michael Zarroli
(74) *Attorney, Agent, or Firm* — Studebaker & Brackett PC

(57) ABSTRACT

An engine generator for driving an air motor to energize an engine is provided which reduces an installation space and facility and running costs. The engine generator (EG) is attached to a fire extinguishing facility (14). The fire extinguishing facility is designed to eject unburnable gas supplied from gas containers (11) and comprises an air motor (10) for driving an engine, and a valve unit (12) designed to drive in response to an instruction signal, control a pressure of the unburnable gas from the gas container and supply the pressure controlled unburnable gas to the air motor (10).

8 Claims, 3 Drawing Sheets

ENGINE GENERATOR

TECHNICAL FIELD

The present invention relates to an engine generator. In particular, the present invention relates to an emergency engine generator in which an air motor is driven to energize a drive source or engine for generating electric power in case of power outage or disaster.

BACKGROUND OF THE INVENTION

Conventionally, an electric motor or air motor is used as a starter for the emergency engine generator. For example, the electric motor is used for the starter of the emergency generator equipped with a liquid-fuel engine because a gas-fuel supply from town gas facilities can be disconnected in case of disasters such as earthquakes. The air motor, on the other hand, is used for the starter of the emergency generator with a gas turbine engine which drives using energy obtained by combusting gaseous fuel because an internal spark in the electric motor can ignite leaked gas.

Accordingly, as described in JP 6-173715 A, the conventional air motor starter is designed so that high pressure air is accumulated in air supply tanks to supply pressurized air for the air motor, which needs a large scale compressor for generating the high pressure air.

Using the electric motor as the starter needs the power supply batteries for driving the motor to be recharged up to a certain voltage after the completion of the driving of the engine. Typically, the recharge takes considerable time. This means that, if another outage would occur during the recharge, it may be impossible to re-energize the engine. Also, the discharged batteries should promptly be replenished with electricity, which needs that the batteries are always electrically connected to a battery charger. Further, weakness of battery should always be detected. Furthermore, the disposal of exhausted batteries results in environmental pollution.

Using air motor needs an air compressor and a high-pressure reservoir, which requires a large space for their installation and their installation works. Also, noise and vibration reduction facilities are needed to reduce noises and vibrations which occur during operations of the air compressor. Further, a drain chamber is needed for removing lubricant oil from the drive source of the air compressor and the compressed air generated by the air compressor, which increases the installation cost and causes additional costs for maintenance of the drain chamber and for disposal of the lubricant collected at the drain chamber. Furthermore, a larger high-pressure reservoir is needed to drive the air motor for energizing the engine frequently. However, a considerable time is required to fill the tank with the pressurized air.

Accordingly, the present invention is to provide an emergency engine generator which uses fire-extinguishing gas from fire-extinguishing equipment as driving medium for driving the engine in a reliable manner and needs minimum space and costs such as facility and running costs.

To this purpose, an embodiment of an engine generator according to the invention, which is attached to a fire extinguishing facility designed to eject unburnable gas supplied from gas containers, comprises an air motor for energizing an engine; and a start-up valve unit which is designed to drive in response to a start-up instruction signal, control a pressure of the unburnable gas from the gas container and supply the pressure controlled unburnable gas to the air motor.

According to the engine generator, in case of outrage the air motor is driven using the unburnable gas from the gas container. Then, the engine is energized by the air motor. Accordingly, no conventional large air compressor or the reservoir for accommodating the compressed air is needed. This results in that an installation space and a manufacturing cost of the engine generator are considerably reduced. Also, a running cost is also reduced considerably because the maintenance cost needs only replacing the used gas containers. Further, the fire extinguishing gas for use in the fire extinguishing facility which is required to be installed in the buildings and business facilities is used for driving the air motor to energize the engine, which does not need additional gas containers exclusively for the driving gas source of the air motor. This considerably simplifies the overall structure including the fire extinguishing facility. Also, the fire extinguishing facility can be administered in association with the overall maintenance of the engine generator. Further, because the valve unit controls the pressure of the unburnable gas from the gas container to a certain pressure suitable for the driving of the air motor, which ensures that the air motor drives in a reliable manner to energize the engine.

Preferably, nitrogen gas is used for the unburnable gas because the nitrogen gas is unlikely to ignite at high pressures and therefore it is preferably used as a driving fluid of the air motor for energizing the gas-fuel engine. Also, the nitrogen gas does not result in generation of air pollution or greenhouse effect.

Preferably, the start-up valve unit reduces the pressure of the unburnable gas from the gas container. This ensures that the pressure of the unburnable gas is reduced to a predetermined pressure suitable for driving the air motor even if the pressure of the unburnable gas in the gas container is inappropriate for driving the air motor or varies with respect to each container. This in turn allows using commercially available gas containers containing the unburnable gas at different pressures.

Preferably, the engine generator comprises a fire extinguishing gas passage for supplying the unburnable gas from the gas container, and a gas supply passage which is branched from the fire extinguishing gas passage for supplying the unburnable gas to the air motor. This allows that the unburnable gas is supplied to the air motor as driving gas, with a simple arrangement of providing the branched passage.

Preferably, the engine generator comprises a plurality of spare container units, each unit having a plurality of spare gas containers for containing unburnable gas to be used for a one-time driving of the engine. This allows that, when it is impossible to use the unburnable gas from the gas containers in the fire extinguishing facility for some reason, the engine is driven by using the unburnable gas of the spare containers. Also, the plurality of spare container units allow the engine to be driven a plurality of times. Further, small-sized commercially available economical gas containers can be used for the spare containers to construct the spare gas unit with a certain amount of gas needed for the one-time driving of the engine.

The engine generator according to another embodiment of the invention comprises an engine, an electric generator to be driven by the engine, an air motor for driving the engine, a gas container for containing unburnable gas and a valve unit for controlling a pressure of the unburnable gas from the gas container in response to a start-up instruction and supplying the pressure controlled unburnable gas to the air motor.

According to the arrangement, the air motor is driven by the unburnable gas from the gas container. This allows the engine to be driven at electric outage and no conventional large-scale compressor or reservoir for accommodating the compressed air is needed, which considerably reduces the installation space or manufacturing cost. Further, the maintenance needs only replacement of the used gas containers, which also reduces running cost considerably. Furthermore, the valve unit controls the pressure of the unburnable gas from the gas container to a certain pressure suitable for driving of the air motor, which ensures a reliable driving of the air motor to energize the engine.

Preferably, the engine generator comprises a plurality of container units, each unit having a plurality of gas containers for containing unburnable gas to be used for a one-time driving of the engine. This arrangement allows the small-sized commercially available gas containers are used to construct the container unit with a certain amount of gas necessary for the one-time driving of the engine. Also, the plurality of container units, each unit being used for one-time driving of the engine, allows the engine to be driven a plurality of times.

According to the engine generator of the invention, the engine can be energized even at electric outrage. Also, no conventional large air compressor or the air reservoir for accommodating the compressed air is needed. This results in that an installation space and a manufacturing cost of the engine generator are considerably reduced. Also, a running cost is also reduced considerably. Further, the valve unit controls the pressure of the unburnable gas from the gas container to a certain pressure suitable for driving of the air motor, which ensures a reliable driving of the air motor to energize the engine.

BRIEF DESCRIPTIONS OF THE DRAWINGS

PREFERRED EMBODIMENT OF THE INVENTION

With reference to the accompanying drawings, preferred embodiments of the invention will be described below. Like reference numbers denote like or similar parts throughout the specification.

Figure 1:
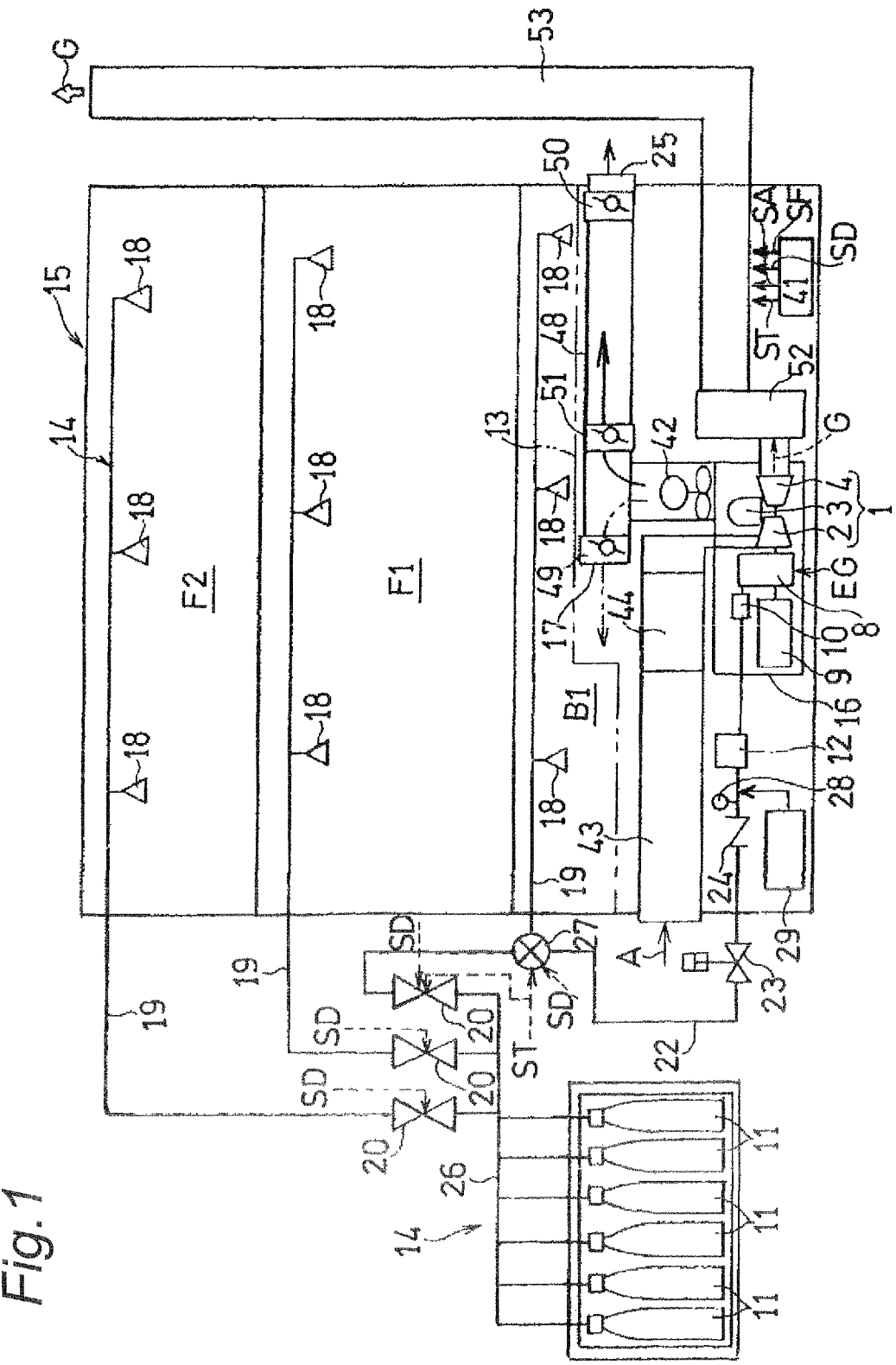
FIG. 1 is a schematic view showing an engine generator according the first embodiment of the invention.

FIG. 1 shows an emergency gas turbine generator, generally indicated at EG, according to the invention and a fire extinguishing facility generally indicated at 14. According to the embodiment, the generator EG is a gas turbine generator. The gas turbine generator EG is installed within a generator room 13 in the first the basement B1, for example, of the building 15 or business facility. A gas turbine engine 1 is provided which comprises major components such as a compressor 2, combustors 3 and a turbine 4 and is connected through a reducer 8 to a generator 9. The fire extinguishing facility 14 is extended throughout the building 15. In the embodiment, several equipments of the facility 14 are disposed in the first basement B1, the first floor F1 and the second floor F2.

The gas turbine engine 1, the reducer 8 and the generator 9 are accommodated within a generator housing 16. The housing 16 houses the compressor 2 which is connected to an intake duct 43 so that atmospheric air A is supplied from the exterior of the building 15 to the compressor 2. The intake duct 43 houses a silencer 44 provided therein. The housing 16 is connected to a ventilation duct 48 for ventilation of the housing 16. The ventilation duct 48 houses a ventilation fan 42 provided therein and is branched on a downstream side of the ventilation fan 42 into two passages, one passage which houses a first switching damper 49 for opening and closing a communication opening 17 for communicating the interior of the housing 16 with the generator room 13 and the other passage which houses an outlet damper 50 for opening and closing of a ventilation opening 25 communicated with the exterior of the building 15 and a second switching damper 51 provided between a ventilation fan 42 and the outlet damper 50. The turbine 4 is connected to an exhaust duct 53 so that the exhausted gas G from the turbine 4 is exhausted through the silencer 52 and the exhaust duct 52 into the atmosphere.

The gas turbine generator EG is combined with the fire extinguishing facility 14 of the building 15. The fire extinguishing facility 14 comprises a plurality of gas containers 11 accommodated within the container room so that fire extinguishing fluid or unburnable gas such as nitrogen gas is stocked at a certain pressure within the respective containers. The outlets of the fire extinguishing nitrogen gas container 11 are connected to a common gas passage 26. The passage 26 is connected through another passages 19 provided for respective floors B1, F1 and F2 and though respective selection valves 20 for opening and closing respective passages 19 to ejection heads or sprinklers 18 mounted in the ceilings of the basement B1 and the first and second floors F1 and F2. The fire extinguishing nitrogen gas containers 11 are filled with nitrogen gas at a high pressure of about, for example, 30 MPaG (gauge pressure).

With the fire extinguishing facility 14, when any one of the fire detectors (not shown) disposed in respective floors detects fire, a start-up instruction signal ST is delivered to the selection valve 20 provided for the associated floor B1, F1 or F2. This opens the selection valve 20 to cause the nitrogen gas from the container or containers 11 to be transported through the passage 19 and then ejected from the associated sprinklers 18.

The gas turbine generator EG comprises an air motor 10 for energizing the gas turbine engine 1 and a gas supply passage 22 for transporting the nitrogen gas through a start-up valve unit 12 to the air motor 10. The gas supply passage 22 is connected at its upstream end to the passage 19 for the first basement in the fire extinguishing facility 14 through a switching valve 27. The switching valve 27 can take any one of four positions; a fist position for connecting between the associated switching valve 20 and the associated passage 19, a second position for connecting between the associated switching valve 20 and the passage 22, a third position for connecting the associated switching valve 20 and the associated passages 19 and 22, and a closing position for closing between the associated switching valve 20 and the associated passage 22, which allows that gas turbine generator EG to use the nitrogen gas of the containers 11 in the fire extinguishing facility 14 as unburnable gas for driving the air motor.

The gas supply passage 22 comprises a start-up valve unit 12 for controlling the unburnable gas from the container 11 so that it has a certain pressure suitable for driving the air motor 10 in response to a drive signal. A pressure reducing valve 23, a check valve 24 and a pressure detector 28 are provided on the upstream side of the unit and the downstream side of the switching valve 27. Spare container units 29 are provided on the downstream side of the pressure detector 28. The pressure reduction valve 23 is designed so that the nitrogen gas from the containers 11 through the valves 20 and 27 into the unit 12 has a certain reduced pressure of, for example, 1.2 to 3.0 MPaG. The pressure detector 28 is designed to detect that the gas pressure in the passage 22 is less than a certain value, which allows the spare gas to be supplied from the spare container units 29.

Figure 2:
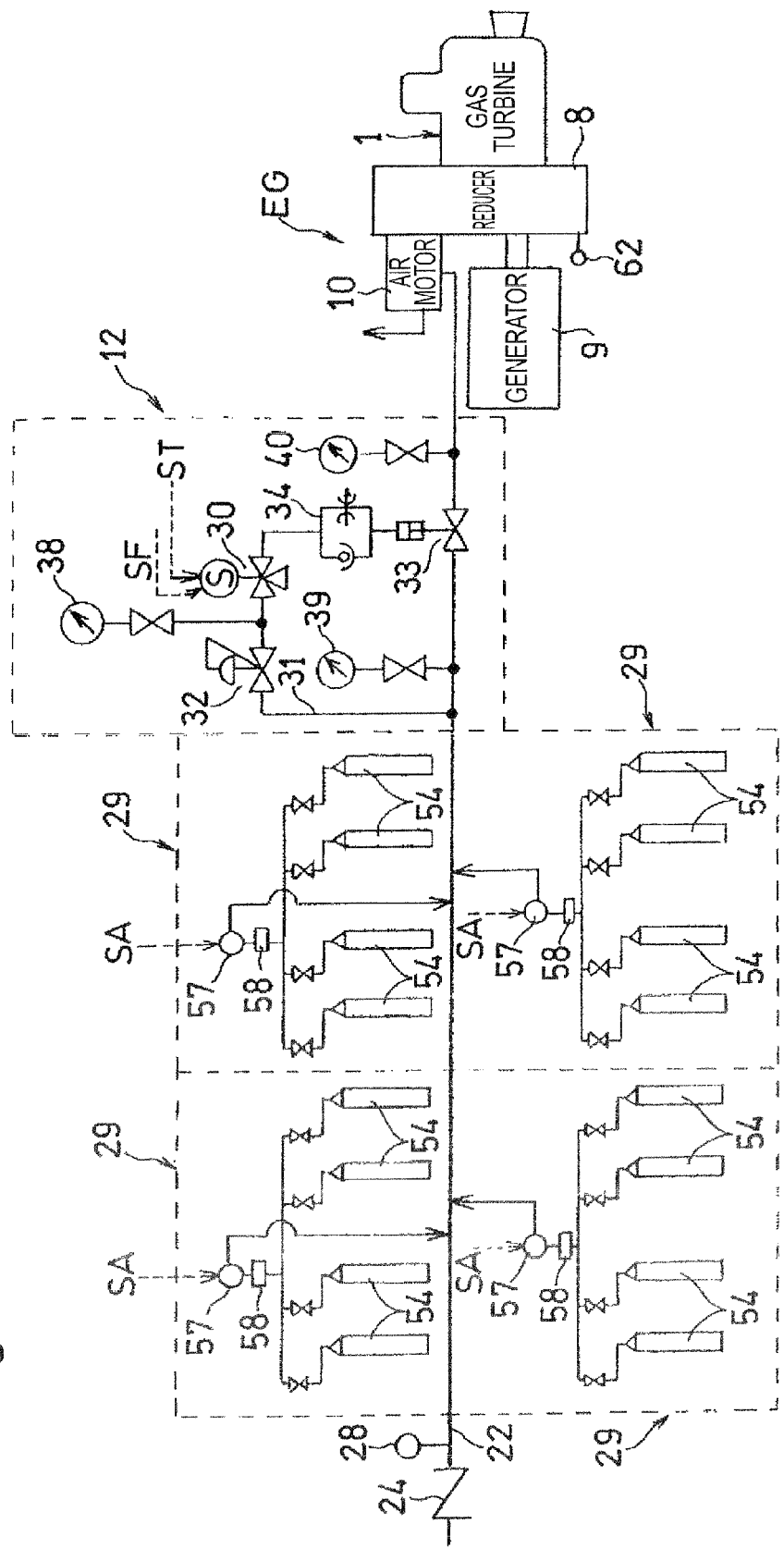
FIG. 2 is a diagram showing a start-up valve unit which is incorporated in the emergency engine generator in FIG. 1.

FIG. 2 shows details of the start-up valve unit 12 and the spare container units 29. The start-up valve unit 12 is designed to drive at the power outage so that the pressure of the nitrogen gas from the nitrogen gas container 11 through the passages 19 and 22 is reduced to a certain value suitable for the driving of the air motor 10 and then the pressure-reduced nitrogen gas is supplied to the air motor 10.

Specifically, when the controller 41 (FIG. 1) for controlling the fire extinguishing facility 4 and the gas turbine generator EG detects the electric outrage, it generates the start instruction signal ST. The signal ST is then transmitted to the three-way electromagnetic valve 30, the selective valve 20 for the basement of the fire extinguishing facility 14 and the switching valve 27. This causes the selective valve 20 to take the open position and the switching valve 27 to take the second position, allowing the nitrogen gas from the container 11 to pass through the valves 20 and 22 into the gas supply passage 22. The pressure of the nitrogen gas is reduced to about 1.2-3.0 MPaG by the reducer 23 and then the pressure-reduced nitrogen gas is transported into the branch 31 of the start-up valve unit 12 in FIG. 2 where the pressure is again reduced by the pilot reducer 32 to a predetermined pressure suitable for driving the main reducer 33. The pressure-reduced nitrogen gas is supplied to the main reducer 33 through the velocity control valve 34. This results in that the main reducer 33 reduces the pressure of the nitrogen gas of 1.2-3.0 MPaG from the gas supply passage 22 to a predetermined pressure suitable for driving the air motor 10 of, for example, 0.6-1.0 MPaG. Then, the pressure-reduced nitrogen gas is supplied to the air motor 10.

The start-up valve unit 12 comprises a pressure gauge 38 for indicating the pressure of the nitrogen gas of which pressure is controlled by the pilot reducer 32 and a pressure gauges 39 and 40 for indicating the pressures of the nitrogen gas on the upstream and downstream sides of the main reducer 33, respectively.

According to the gas turbine generator EG so constructed, the air motor 10 is driven by the supply of the nitrogen gas with the predetermined reduced-pressure of about 0.6-0.7 MPaG obtained by the main reducer 33 of the start-up valve unit 12 to energize the gas turbine engine 1 through the reducer 8 associated with the air motor 10. By the driving of the gas turbine engine 1, the generator 9 is driven through the reducer 8 to supply electric power to the electric facilities and devices in the building 15 during the outage. The urban gas or heating oil is used as fuel for the gas turbine engine 1. After the gas turbine engine 1 is energized, a start clutch not shown is turned off so that the air motor 10 is drivingly disengaged from the gas turbine engine 1. Also, when the controller 41 determines by the use of the rotation number signal representing the number of rotation of the gas turbine transmitted from the rotation sensor 62 provided in the reducer 9 shown in FIG. 9 that the rotation number of the gas turbine engine reaches a predetermined number necessary for its self-sustained operation, the controller 41 transmits a signal SF for terminating the start-up operation. The signal SF is then transmitted to the three-way electromagnetic valve 30 of the start-up valve 12 shown in FIG. 2 for closing. This results in that the main reducer 33 is closed and the gas supply to the air motor 10 through the gas supply passage 22 is terminated.

The spare container units 29 are prepared not only for another emergency in which the nitrogen gas from the nitrogen gas container is unable to be used due to any failure of the peripheral devices of the gas container 11 but also for ensuring the gas turbine engine EG to be driven even during the maintenance operations of the gas turbine generator EG, apart from the maintenance operations of the fire extinguishing facility 14. Each spare container unit 29 comprises a plurality of spare nitrogen gas containers 54 connected in parallel to each other for one-time driving of the air motor 10. A commercially available, inexpensive nitrogen gas container can be used for the container 54. Also, each spare container unit 29 comprises a pressure control 57 with a safety valve 58 for controlling the pressure of the nitrogen gas to be supplied into the passage 22 to a predetermined value of, for 1.2-3.0 MPaG, for example. A commercially available pressure control may be used for the pressure control 57.

A test drive of the gas turbine engine 1 using the spare container units 29 are performed as follows. At first, the start-up signal ST is transmitted from the controller 41 (FIG. 1). In response to this, the selection valve 20 and the switching valve 27 are driven so that the gas supply passage 22 is connected to the common gas passage 26. In this condition, if the pressure detected by the pressure detector 28 is less than the predetermined value, the nitrogen gas container 11 is determined to be in trouble and then the spare container unit 29 is energized. In this process, the controller 41 outputs the start-up signal for spare container SA, following the start-up signal ST. The start-up signal SA is transmitted into the three-way electromagnetic valve 30 of the start-up valve unit 12 and the highest priority spare container unit 29. This opens the three-way electromagnetic valve 30 and drives the pressure control 57 of the spare container unit to be used, energizing the start-up valve unit 12 similar to the above-described operations at the outage to drive the air motor 12. Although vary depending upon the types of engine, with the arrangement equipped with four spare container units 29, 1,000 kW gas turbine engine can be driven at least four times.

According to the arrangement, when the outage is detected, the controller 41 (FIG. 1) transmits the signal ST into the selection valve 20, the switching valve 27 and the three-way magnetic valve 30 of the start-up valve unit 12 to drive the air motor and the ventilation fan 42 (FIG. 1) simultaneously. In this operation, the first switching damper 49 in the ventilation duct 48 is closed and the second switching damper 51 and the outlet damper 50 are opened. This allows that, by the operation of the ventilation fan 42, the nitrogen gas from the air motor 10 is transported through the ventilation duct 48 and then discharged from the outlet 25 to the exterior of the building 15 as indicated by the solid lines.

When a fire occurs in the first basement B1 during the electric outage, the switching valve 27 takes the third position to connect between the switching valve 20 and the passages 19 and 22, in response to the fire extinguishing instruction signal SD from the controller 41. The switching valve 27, when received both signals ST and SD, takes the third position. Also, the controller 41 opens the first switching damper 49 and closes the second switching damper 50 and the switching damper 51 to discharge the atmospheric air within the housing 16 from the communication opening 17 into the generator room 13. This meets the requirements of the Fire Defense Law which requires that the fire origin or generator room 13 be isolated from its exteriors. Also, the nitrogen gas included in the atmospheric air within the housing 16 is also discharged into the generator room 13, which promotes the fire extinguishing in the generator room 13 and the cooling of the interior of the housing 16.

When a fire occurs in any of the floors of the building 15 without outage, the controller 41 transmits a fire extinguishing instruction signal SD to the switching valve 20 of the passage 19 in the firing floor. This opens the switching valve 20 to allow the nitrogen gas to be supplied from the nitrogen gas container 11 through the opened switching valve 20 and the passage 19 and then sprayed through the spray head 18. If the fire occurs in the first basement B1 without outage, only the fire extinguishing instruction signal SD is transmitted, which causes the switching valve 27 to take the first position. This causes the switching valve 20 to be connected to the passage 19, allowing the nitrogen gas to be supplied to the spray head 18, but not to the gas turbine generator EG.

The container 11 in the fire extinguishing facility 14 is filled with nitrogen gas with a certain pressure which is considerably higher than that suitable for the driving of the air motor 10. To this end, the nitrogen gas from the container 11 through the common gas passage 26, the selection valve 20 and the switching valve 27 into the gas supply passage 22 is reduced by the start-up valve unit 12 down to 0.6-1.0 MPaG suitable for driving the air motor 10, which in turn allows that not only the air motor 10 is suitably driven but also the gas turbine engine 1 is reliably energized. Further, because the typical fire extinguishing nitrogen gas container is considerably larger in volume than the small-size commercially available inexpensive nitrogen gas container commercially available nitrogen gas container, which allows the air motor 10 to be driven a predetermined plurality of times.

The gas turbine engine EG does not need various equipments that the conventional air starting equipment needs for driving the air motor by using compressed air, such as large-scale air compressor, air reservoirs, spaces for installations of those equipments, or waste oil disposal facility, which significantly reduces the installation space and manufacturing and maintenance costs. Also, using the air motor eliminates a difficulty in a rapid re-starting and an increased running cost that the conventional electric driving devices driven by electric motors have. Further, the gas turbine generator EG uses the commercially available nitrogen gas containers 11 in which nitrogen gas is compressed, which eliminates filling operations of the nitrogen gas. Furthermore, the nitrogen gas can be used without being subject to any regulations of the gas business law in terms of gas pressure and volume, which significantly reduces construction costs of the facilities.

In addition, the gas turbine generator EG drives the gas turbine engine 1 by using the nitrogen gas in the fire extinguishing containers 11 of the fire extinguishing facility 14 for the driving of the gas turbine engine 1, which eliminates an necessity of providing dedicated nitrogen containers for the driving of the gas turbine. This simplifies the overall system structure than providing the gas turbine generator EG and the fire extinguishing facility 14 at different places. Further, the driving unit of the gas turbine engine EG and the fire extinguishing facility 14 can be administered jointly so that pressures of the nitrogen gas in the fire extinguishing nitrogen gas containers 11 to be used for fire extinguishing and driving of the air motor 11 is periodically checked and, if necessary, the fire extinguishing nitrogen gas containers 11 are replaced with new ones.

Instead of the nitrogen gas, other unburnable gases such as carbon dioxide can be used for the driving of the air motor 10. Nitrogen gas is more advantageous in preventing air pollution, adverse affect due to greenhouse gas or high-temperature ignition than carbon dioxide gas, so that it is more preferably used for the gaseous-fuel gas turbine engine. Some conventional fire extinguishing facilities 14 use the compressed gas such as carbon dioxide or halon. Substituting nitrogen gas for such compressed gas allows the extinguishing gas of the fire extinguishing facility 14 to be used for the driving gas of the air motor 10 and also prevents environmental destruction such as air pollution.

The gas turbine engine 1 of the emergency gas turbine generator EG is required to conduct a test working once a month as a maintenance operation. The fire extinguishing facility 14 with the fire extinguishing gas containers 11 is required to conduct the start-up test workings two times a year. However, it is unfavorable to eject the nitrogen gas from each ejection head 18 of the fire extinguishing facility 14. Practically, the test workings have been conducted by discharging the nitrogen gas from only one or two gas containers 11 to determine whether the nitrogen gas with a certain pressure is ejected from the pressure control 21.

According to the embodiment in FIG. 1, the nitrogen gas of the fire extinguishing containers 11 is used for driving of the air motor 10 of the gas turbine generator EG and also fire-extinguishing. This means that the test workings of the gas turbine generator EG and the fire extinguishing facility 14 is to determine whether the nitrogen gas is supplied reliably from the nitrogen gas containers 11. With the arrangement, 12 times a year test workings of the gas turbine engine 1 using the nitrogen gas from the fire extinguishing gas containers 11 meet the requirements for the gas turbine engine 1 and the fire extinguishing containers 11.

For example, in the test workings for the gas turbine engine 1 using the nitrogen containers 11 of the fire extinguishing facility 14, the switching valve 20 on the passage 19 for the first basement B1 is opened in response to the stat-up instruction signal ST. The start-up instruction signal ST is also transmitted to the three-way electromagnetic valve 12 (FIG. 2) to drive the start-up valve unit 12. Then, it is determined whether the gas turbine engine 1 has been driven by the air motor 10. As above, by the test working in which the gas turbine engine is driven by the supply of the nitrogen gas from the spare nitrogen gas containers 11 of the fire extinguishing facility 14 through the gas supply passage 22, it is determined whether the nitrogen gas from the parallel-arranged nitrogen gas containers 11 is supplied through the common passage 26 into the passage 22. This in turn determines that the passages 19 including the passage 19 of the first basement B1 which is branched from the passage 22 are capable of being supplied with the nitrogen gas.

The test working of the gas turbine engine 1 using the nitrogen gas from the nitrogen gas containers 11 concurrently functions as the test working of the fire extinguishing facility 14. Then, 12 times a year test workings of the gas turbine engine 1 using the nitrogen containers 11 include two-times a year test workings of the fire extinguishing facility 14, which reduces the maintenance fees of the fire extinguishing facility 14 and eases the maintenance of the facilities.

Apart from the test working of the fire extinguishing facility 14, the existence of the spare container unit 29 allows the start-up test workings of the gas turbine engine 1 independently for the maintenance of the gas turbine generator EG. This in turn means that the start-up tests of the gas turbine engine 1 can be carried out only using the spare containers 29, without using the spare nitrogen gas containers 11.

The switching valve 27 may be omitted. In this instance, by the detection of the fire or electric outage, the nitrogen gas is supplied to the passages 19 and 22 of the basement B1 and then ejected from the ejection heads 18 on the passage 19. In addition, the nitrogen gas is discharged from the air motor 10. This allows that the basement B1 will be filled with nitrogen gas immediately even if it has a large capacity. The nitrogen gas is also supplied to the exterior and the interior of the housing 16 to effectively extinguish the fire in the housing 16.

Figure 3:
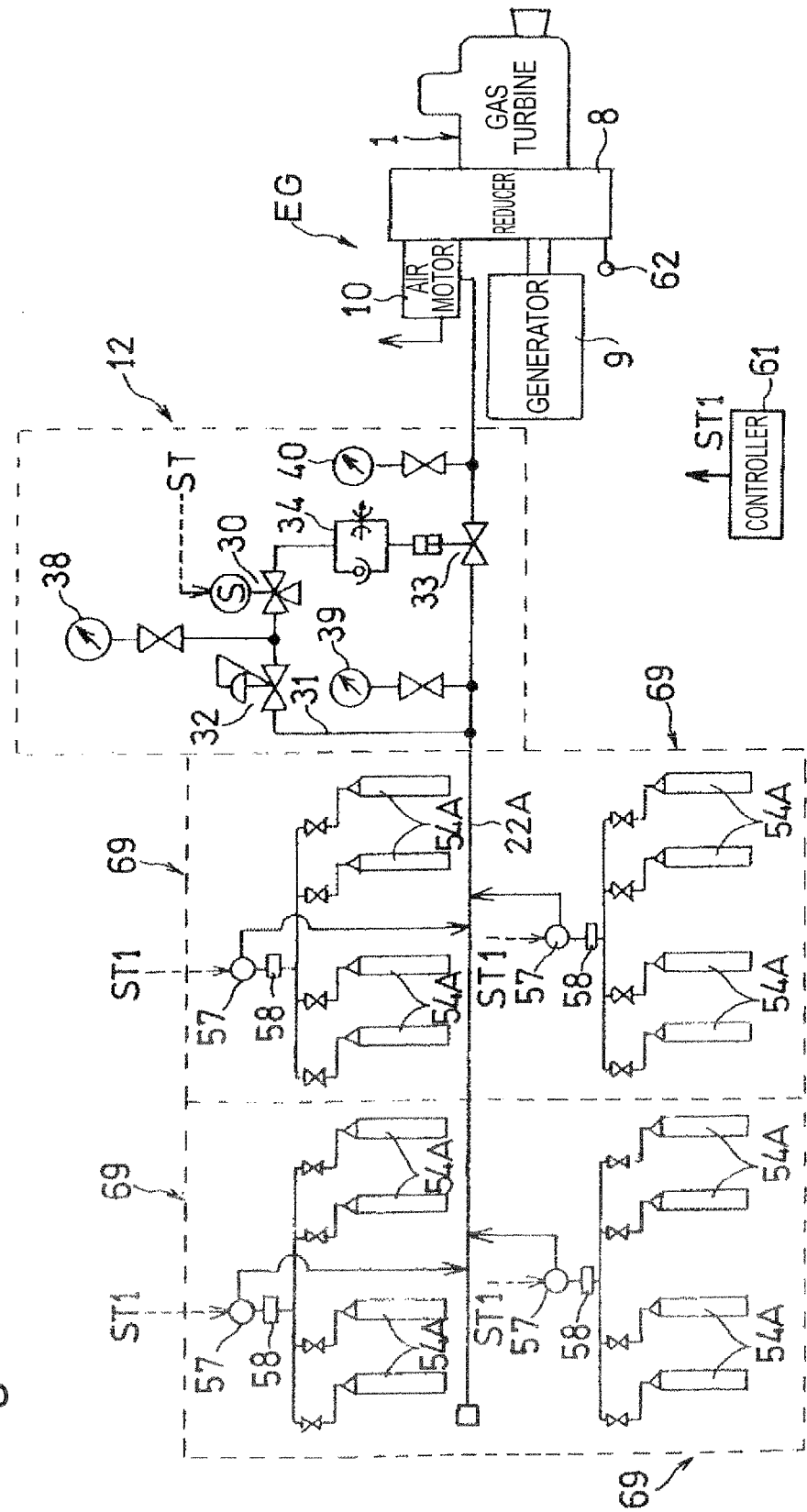
FIG. 3 is a diagram showing the start-up valve unit which is incorporated in the emergency engine generator according to the second embodiment.

FIG. 3 shows a second embodiment. In this embodiment, the gas turbine generator EG, which is not mounted to the fire extinguishing facility and is mounted on, for example, a vehicle which is transported to the site of disaster to supply electricity, comprises container units 69 similar to the spare container units 29 in FIG. 2. Each of the container unit 69 comprises a plurality of commercially available gas containers 5A accommodating inactive gas such as nitrogen gas. The container units 69 are connected to the start-up valve unit 12 through the passage 22. The vehicle may carry a certain amount of fuel such as heating oil for the gas turbine engine 1.

In the start-up operation, the controller 61 for controlling the entirety of the gas turbine generator EG is manually operated to generate a start-up instruction signal ST1. The signal ST1 is transmitted to the three-way electromagnetic valve 30 of the start-up valve unit 12 and the pressure control 57 of the container unit 69 with the highest priority to open the three-way electromagnetic valve 30 and the pressure control 57, which activates the start-up valve unit 12 as described above in terms of the electric outage to drive the air motor 10. This results in that the gas turbine engine 1 is driven through the reducer 8. If the first try fails, the second priority container unit 69 is used to make a second try.

According to the arrangement of the second embodiment, the gas turbine engine 1 is carried by the vehicle to the disaster or construction site where the air motor 10 thereof is driven by the nitrogen gas supplied from the gas containers 54A. This allows that the gas turbine engine 1 can be driven readily without any need for additional drive mechanisms such as large-scale air compressor or air reservoir. Also, the maintenance needs removing used gas containers and mounting new ones instead, which significantly reduces the maintenance cost. Also, because the start-up valve unit 12 controls the pressure of the nitrogen gas from the gas containers 54A to a predetermined value suitable for driving the air motor, the air motor 10 is reliably driven by the pressurized nitrogen gas to drive the gas turbine engine 1.

Further, each container unit 69 comprises a plurality of gas containers 54A to be used for a one-time driving of the air motor. This allows the container unit to be manufactured using small-size commercially available and economical gas containers 54A with a certain amount of gas needed for a single driving of the air motor. Furthermore, the embodiment has plural container units 69, which allows plural start-up operations of the gas turbine engine 1.

Although the gas turbine engine 1 is used in the above-described embodiments, it may be replaced by other engine such as gas engine, diesel engine and micro gas turbine.

It should be noted that the present invention is not limited by the above-described embodiments, and it may be modified without departing from the gist of the invention and such modifications are still within the scope of the claims.

Parts List
1: gas turbine engine
9: generator
10: air motor
11: fire extinguishing nitrogen gas container (gas container)
12: start-up valve unit
14: fire extinguishing facility
18: ejection head
19: passage for fire extinguishing
22: gas supply passage
29: spare gas container unit
54: spare gas container
54A: gas container
69: container unit
EG: engine generator
ST, ST1: start-up instruction signal

What is claimed is:

1. An engine generator, comprising:
an engine;
an air motor for energizing the engine;
a generator to be driven by the engine to generator electricity;
a first gas supply for accommodating and supplying a first unburnable gas;
a switching valve;
a first passage connecting between the first gas supply (11) and the switching valve;
a second passage connecting between the switching valve and an ejection head for ejecting the first unburnable gas therefrom into the air;
a third passage connecting between the switching valve and the air motor;
wherein the switching valve takes any one of three positions, i.e., a first position connecting between the first and second passages, a second position connecting between the first and third passages, and a third position disconnecting between the first passage and the second and the third passages;
a second gas supply connected to the third passage for accommodating and supplying a second unbumable gas, the second gas supply having a plurality of container units, each of the units comprising a plurality of second containers for accommodating the second unburnable gas, an amount of the second unburnable gas in each of the units being an amount necessary for a one-time driving of the air motor for energizing the engine; and
a valve unit for controlling pressures of the first unburnable gas supplied from the first gas supply and the second unburnable gas supplied from the second gas supply to a certain pressure suitable for driving the air motor.

2. The engine generator of claim 1, wherein the first gas supply has one or more first gas containers for accommodating the first unburnable gas.

3. The engine generator of claim 2, wherein the first unburnable gas accommodated in the first gas containers has a pressure of 30 MPaG.

4. The engine generator of claim 3, further comprising a pressure reducer provided in the third passage between the switching valve and the second gas supply, for reducing a pressure of the first unburnable gas to 1.2-3.0 MPaG.

5. The engine generator of claim 4, wherein the valve unit reduces the pressure of each of the first and second unbumable gas to 0.6-1.0 MPaG.

6. The engine generator of claim 4, wherein the second gas supply comprises a pressure control for controlling a pressure of the second burnable gas to 1.2-3.0 MPaG.

7. The engine generator of claim 6, wherein the valve unit reduces the pressure of each of the first and second unbumable gas to 0.6-1.0 MPaG.

8. A building comprising the engine generator of claim 1.

* * * * *